(12) United States Patent
Enthed et al.

(10) Patent No.: US 11,989,765 B2
(45) Date of Patent: May 21, 2024

(54) PRODUCT QUALITY INSPECTION SYSTEM, METHOD, AND DEVICE

(71) Applicant: Inter IKEA Systems B.V., LN Delft (NL)

(72) Inventors: Martin Enthed, Steninge (SE); Anton Berg, Eslöv (SE); Antonia Pehrson, Malmö (SE)

(73) Assignee: Inter IKEA Systems B.V., LN Delt (NL)

( * ) Notice: Subject to any disclaimer, the term of this patent is extended or adjusted under 35 U.S.C. 154(b) by 254 days.

(21) Appl. No.: 17/482,694

(22) Filed: Sep. 23, 2021

(65) Prior Publication Data
US 2022/0222723 A1 Jul. 14, 2022

Related U.S. Application Data

(63) Continuation-in-part of application No. 17/146,957, filed on Jan. 12, 2021.

(51) Int. Cl.
*G06Q 30/00* (2023.01)
*G06Q 30/0601* (2023.01)

(52) U.S. Cl.
CPC .................. *G06Q 30/0623* (2013.01)

(58) Field of Classification Search
CPC .................. G06Q 30/0601–0645; G06Q 30/08
USPC .................. 705/26.1–27.2
See application file for complete search history.

(56) References Cited

U.S. PATENT DOCUMENTS

| 9,891,884 | B1 | 2/2018 | Baughman et al. |
| 9,911,240 | B2 | 3/2018 | Bedikian et al. |
| 2012/0243689 | A1* | 9/2012 | Jeong ...................... G06T 7/254 381/17 |
| 2015/0379168 | A1* | 12/2015 | Galore ............... G06Q 30/0643 703/6 |

(Continued)

FOREIGN PATENT DOCUMENTS

| CN | 109550248 A | 4/2019 |
| WO | 2018/005219 A1 | 1/2018 |
| WO | 2019/036773 A1 | 2/2019 |

OTHER PUBLICATIONS

Lee, Dami, Ikea's 25-minute ASMR commercial is the most satisfying way to shop for furniture, Aug. 9, 2017, the Verge, accessed at [https://www.theverge.com/2017/8/9/16120624/ikea-asmr-commercial-oddly-youtube] (Year: 2017).*

(Continued)

*Primary Examiner* — Michael Misiaszek
*Assistant Examiner* — Lindsey B Smith
(74) *Attorney, Agent, or Firm* — Merchant & Gould P.C.

(57) ABSTRACT

Methods and systems for a product quality inspection system. One aspect is a method of conveying a quality of a furnishing with an e-commerce system, the method comprising presenting with the e-commerce system a listing for a furnishing including a scene with an image of the furnishing, the image of the furnishing having a depth value corresponding to a location of the image of the furnishing in the scene, receiving an audio playback request, and presenting in response to the audio playback request an audio recording of an interaction with the furnishing, wherein the audio recording is indicative of a material composition of the furnishing and the audio recording includes a sound effect based on the depth value.

20 Claims, 16 Drawing Sheets

(56) References Cited

U.S. PATENT DOCUMENTS

| | | |
|---|---|---|
| 2018/0005312 A1 | 1/2018 | Mattingly et al. |
| 2018/0293804 A1* | 10/2018 | Lotto ...................... H04W 4/02 |
| 2019/0373395 A1* | 12/2019 | Sarkar .................. G06T 19/006 |
| 2020/0066042 A1* | 2/2020 | Marsh .................. H04N 13/344 |
| 2020/0296532 A1 | 9/2020 | Wang et al. |
| 2020/0320606 A1 | 10/2020 | Sandow |
| 2021/0020315 A1 | 1/2021 | Stone et al. |
| 2021/0067750 A1* | 3/2021 | Sandow .................. G06T 15/04 |
| 2021/0097599 A1 | 4/2021 | Sandow |

OTHER PUBLICATIONS https://www.kitchenplanner.ikea.com/us/UI/Pages/VPUI.htm—1 page, retrieved Apr. 21, 2021—Known Prior Art.

https://www.tonepedia.com/player#/electric/effect—1 page, retrieved Apr. 21, 2021—Known Prior Art.

Final Office action dated Jul. 20, 2023 in the corresponding U.S. Appl. No. 17/146,957 (33 pages).

PCT International Search Report and Written Opinion for PCT Application No. PCT/EP2022/050458 mailed May 4, 2022 (12 pages).

Militaru, Alice, IKEA, ASMR: The sounds of thread count, Mar. 5, 2020, the Daily Targum, accessed at [https://dailytargum.com/article/ 2020/03/ikea-asmr-story] (Year: 2020).

\* cited by examiner

PRODUCT QUALITY INSPECTION SYSTEM, METHOD, AND DEVICE

CROSS REFERENCE TO RELATED APPLICATION

This application is a continuation-in-part of U.S. application Ser. No. 17/146,957, filed on Jan. 12, 2021, entitled PRODUCT QUALITY INSPECTION SYSTEM, the disclosure of which is hereby incorporated by reference in its entirety. To the extent appropriate, a claim of priority is made to the above identified application.

BACKGROUND

Products are often purchased in stores after a customer inspects the item. In many examples the customer may view the product being sold or may view a demo product. It is common for a customer to interact with such a product and make assessments about the quality of a material based on the interaction.

Products are also often purchased online. A customer may view a product on an e-commerce application including pictures and reviews of a product. After viewing the product, the customer can decide on whether they wish to purchase the item based on the information received.

SUMMARY

In general terms, this disclosure is directed to a product quality inspecting system. In some embodiments, and by non-limiting example, the product quality inspection system is part of an e-commerce system. The product quality inspection system presents an audio recording for playback to the user, wherein the audio recording is indicative of a material composition of the furnishing, such as to enable the user to inspect a quality of the furnishing.

One aspect is a method of conveying a quality of a furnishing with an e-commerce system, the method comprising presenting with the e-commerce system a listing for a furnishing including a scene with an image of the furnishing, the image of the furnishing having a depth value corresponding to a location of the image of the furnishing in the scene, receiving an audio playback request, and presenting in response to the audio playback request an audio recording of an interaction with the furnishing, wherein the audio recording is indicative of a material composition of the furnishing and the audio recording includes a sound effect based on the depth value.

Another aspect is an e-commerce system, the e-commerce system comprising one or more processors, and one or more memory storage devices, the one or more memory storage devices storing instructions that, when executed by the one or more processors, cause the e-commerce system to provide a user interface with a listing for a furnishing including a scene with an image of the furnishing, the image of the furnishing having a depth value corresponding to a location of the image of the furnishing in the scene, wherein the user interface receives an audio playback request and presents in response to the audio playback request an audio recording of an interaction with the furnishing, and wherein the audio recording is indicative of a material composition of the furnishing and the audio recording includes a sound effect based on the depth value.

Yet another aspect is a user computing device, the user computing device comprising a processor, and one or more memory storage devices, the one or more memory storage devices storing instructions that, when executed by the processor, cause the user computing device to present a user interface having a listing for a furnishing inducing a scene with an image of the furnishing, the image of the furnishing having a depth value corresponding to a location of the image of the furnishing in the scene, receive an audio playback request, and present in response to the audio playback request an audio recording of an interaction with the furnishing, wherein the audio recording is indicative of a material composition of the furnishing and the audio recording includes a sound effect based on the depth value.

DETAILED DESCRIPTION

Figure 1:
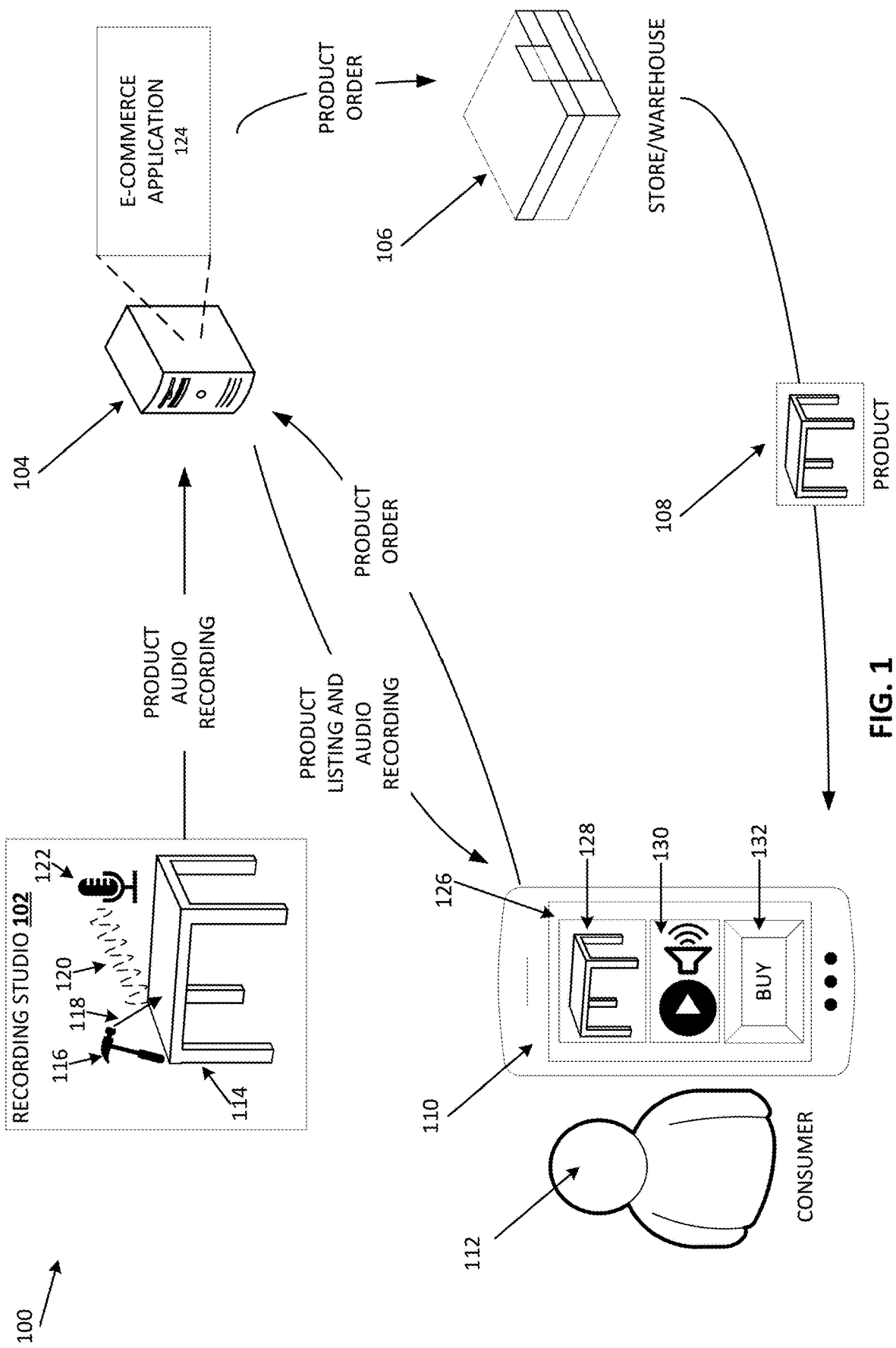
FIG. 1 is a schematic diagram illustrating an example product quality inspection system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic diagram illustrating an example product quality inspection system 100. In this example, the product quality inspection system 100 includes a recording studio 102, a server 104, a store/warehouse 106, a product 108, a consumer computing device 110, and a consumer 112. The recording studio 102 includes a test product 114 an interaction object 116, an interaction method 118, an interaction sound 120, and a recording device 122. The server 104 includes an e-commerce application 124. The consumer computing device 110 includes a product quality conveyance application 126. The product quality conveyance application 126 includes a product viewer 128, an interaction sound controller 130, and a product purchaser 132.

In the example shown, the product quality inspection system 100 includes a recording studio 102. The recording studio 102 can include a test product 114, an interaction object 116, an interaction method 118, an interaction sound 120, and a recording device 122.

The test product 114 can be any type of product. In some examples the test product 114 a furnishing product. In some embodiments, many different products, or an entire catalog of products are to be placed in the recording studio 102 so that the system can capture recording which conveys the material properties of the various products.

In some embodiments, the recording studio 102 is a room which is optimized to record one or more sounds capturing one or more interactions with the test product 114. Interacting with the test product 114 can include an interaction object 116 and an interaction method 118.

The interaction object 116 can be any object which is able to interact with the test product 114. In the example shown the interaction object 116 is a hammer. In other examples the interaction object 116 could be a hand, a finger, a foot, a rubber hammer, or a drumstick. In some examples, more than one interaction object 116 is used.

The interaction method 118 is any interaction with a product. Examples of interaction method 118 include hitting, tapping, scratching, rubbing, and any other motion which makes sound with a material. In some examples multiple interaction methods 118 are recorded by the recording device 122.

The interaction object 116 and the interaction method 118 are used to interact with the test product 114. This interaction creates an interaction sound 120 which is received by the recording device 122.

The recording device 122 is a device which picks up audio. The recording device 122 can be positioned in the recording studio 102 to optimally pick up the sound from the interaction in order to convey a material property of the test product 114. One example of a recording device 122 is a microphone. In some examples, more than one audio recording device 122 is used.

Once the interactions are captured the one or more recordings are sent from the recording studio 102 to the server 104 through a network. The recordings generated and stored in one of a variety of data formats, such as a lossy format (MP3, AAC, etc.), a loss-less format (FLAC, ALAC, etc.), or in an uncompressed format (WAW, AIFF, etc.). An example of the recording studio 102 is described and illustrated in FIG. 2. An example method for recording an interaction is described in FIG. 3.

The server 104 can be one or more severs containing one or more processors and one or more storage mediums. The server 104 includes an e-commerce application 124. The server 104 is connected to a network. In some examples, the network is a public network such as the internet. The server 104 can receive one or more recordings from the recording studio 102.

The e-commerce application 124 sends one or more products and one or more associated audio recordings to a consumer computing device 110. Each of the one or more audio recordings can convey a material product quality of the associated product. The e-commerce application 124 can then receive an order placed by the consumer 112. In response to receiving a product order the e-commerce application 124 can send the order to a store/warehouse 106 which will complete the order. The server 104 is described in greater detail in FIG. 4.

The store/warehouse 106 can be one or more stores/warehouses which operates with an e-commerce platform. The store/warehouse 106 receives an order form the server 104 and fulfils the order by sending the ordered product to the consumer 112.

The product 108 can be any type of product which is sold. In the example shown the product 108 is a table. In other examples, the product 108 can be any other type of furnishing.

The consumer computing device 110 is a computing device used by one or more consumers for online shopping. The consumer computing device 110 can be a computer, tablet, mobile phone, or any other type of computing device which can connect to the server 104 using a network. In some examples, the consumer computing device 110 is configured for presenting an augmented reality (AR) or a virtual reality (VR) including the product 108. Also shown in FIG. 1 is a consumer 112 using the consumer computing device 110 to conduct online shopping.

In the example shown, the consumer computing device 110 includes a product quality conveyance application 126. The example product quality conveyance application 126 includes a product viewer 128, an interaction sound controller 130, and a product purchaser 132.

The product viewer 128 displays the product. In some examples, the consumer 112 selects the displayed product from a list of products or searches for the product. The product viewer 128 may also include additional modification options such as modifications to product size, color, or material.

The interaction sound controller 130 in some examples is a controller for playing an interaction sound. The interaction sound controller 130 can be configured to receive an audio playback request, which causes the consumer computing device 110 to play the interaction sound associated with the product. The interaction sound is a sound which captures an interaction with a product that conveys a material property of the product.

The product purchaser 132 allows the consumer 112 to select a product to purchase. When the consumer selects the product purchaser a checkout process can be imitated. In some examples the product purchaser 132 may add the product to a shopping cart where the user can complete the purchase.

Figure 2:
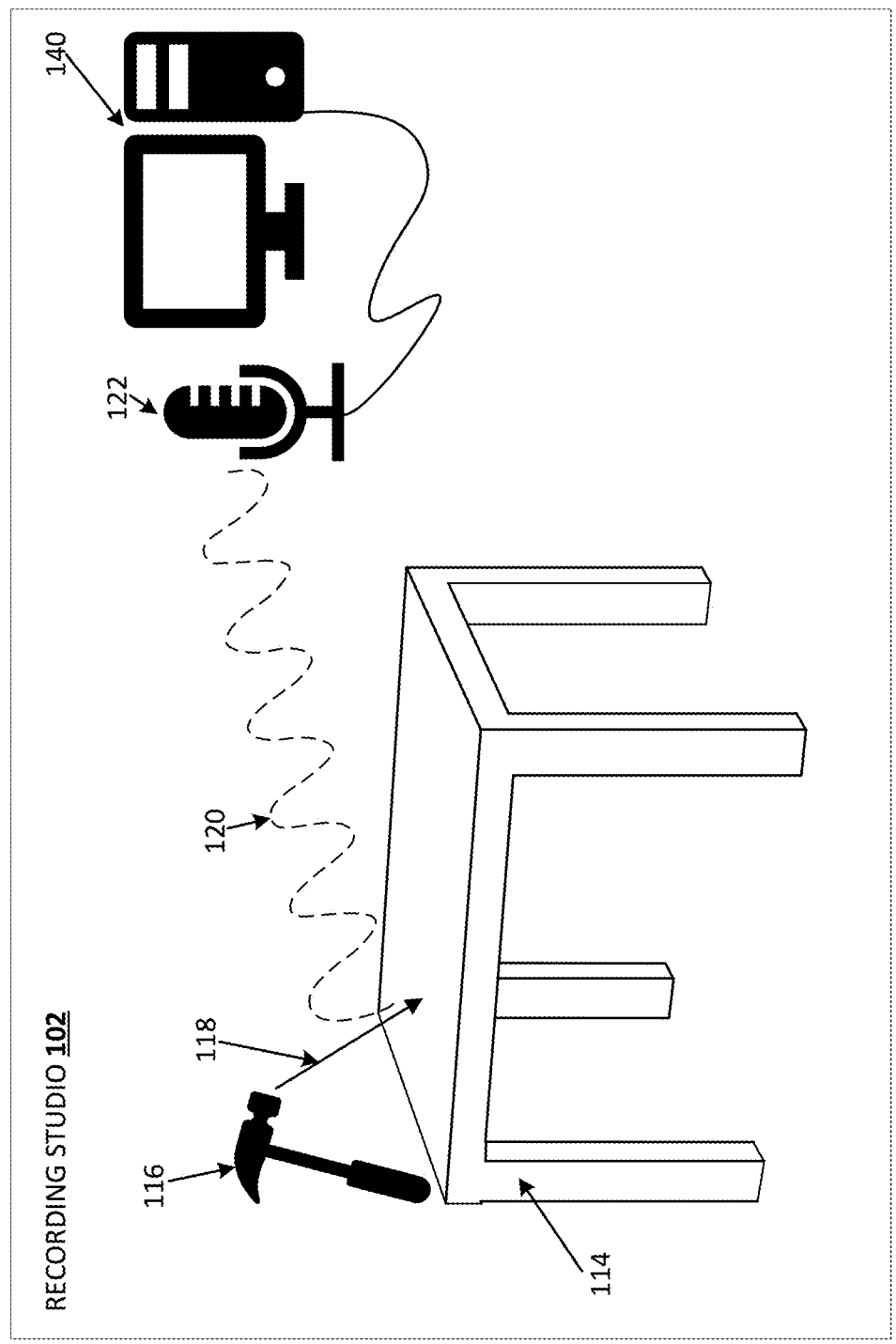
FIG. 2 is a schematic diagram illustrating an example recording studio.

FIG. 2 is a schematic diagram illustrating an example recording studio 102. The recording studio 102 is an example of the recording studio 102, as shown in the example of FIG. 1. The recording studio 102 includes a test product 114 an interaction object 116, an interaction method 118, an interaction sound 120, a recording device 122, and a computing device 140.

The recording studio 102 includes a test product 114. The test product 114 can be any product which is sold using e-commerce. In some examples, all products sold on an e-commerce platform include a test product 114 which is placed, interacted with, and recorded in a studio. In other examples, a few test products 114 are selected based on different material properties to capture a range of material properties. For example, one wood table is selected as test product 114. This test product can then be used to record the material properties for several related wood products which would have similar material properties.

The recording studio 102 can include an interaction object 116. The interaction object 116 can be any object which can interact with a product. Examples, of interaction objects 116 include a hand, a finger, a foot, a rubber hammer, a metal hammer, and a drumstick. In one example, a single interaction object 116 is used to interact with the test product 114. In other examples several different interaction objects 116 are used to capture different material properties of the test product 114. In some examples the test product 114 contains differ parts made of different materials. For example, the table may have a wood platform and metal legs.

The recording studio 102 can include an interaction method 118. Examples of interaction method 118 include hitting, tapping, scratching, rubbing, and any other motion which makes sound with a material. In some examples, one interaction method 118 is tested, such as tapping. In other examples, many different interaction methods 118 are tested. In some examples, the test product 114 contains surfaces with different materials and the interaction method can be applied to the different surfaces.

The recording studio 102 can include an interaction sound 120. An interaction sound 120 is created using the interaction object 116 and the interaction method 118 on the test product 114. The interaction sound 120 is based on the material composition properties of the test product 114. A test product 114 may have different material composition properties on different surfaces, the interaction sound 120 in such a case will be based recording the interaction with that surface.

The recording studio 102 includes a recording device 122. The recording device 122 can be one or more microphones. The recording device can be placed in such a manner to capture the interaction sound 120 and reduce noise.

The recording studio 102 can include a computing device 140. The computing device receives and processing the interaction sound 120 captured by the recording device 122. In some examples, the computing device is connected to a public network, such as the internet, and will upload information about the test product 114, the interaction object, interaction method, and the one or more captured sound recordings to a remote server.

Figure 3:
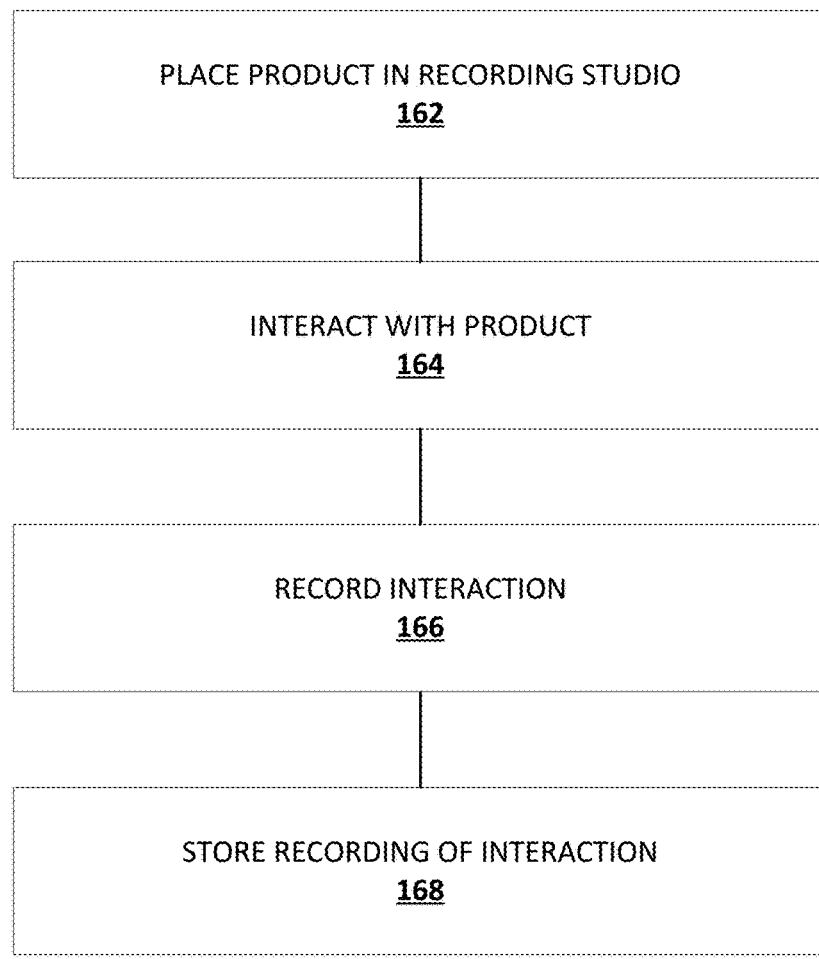
FIG. 3 is a flow chart illustrating an example method of recording an interaction with a product.

FIG. 3 is a flow chart illustrating an example method 160 of recording an interaction with a product. The method 160 can include the operations 162, 164, 166, and 168. In some examples, the method 160 is conducted in the recording studio 102 illustrated and described in reference to FIG. 2.

The operation 162 a test product is placed in a recording studio. FIG. 2 illustrates and describes an example of the test product and the recording studio. In some examples, the test products are different furnishings.

The operation 164 is an interaction with a test product. An interaction with a test product can include an interaction object and an interaction method. The purpose of interacting with the product is to create a sound which conveys a material property of the product. For example, tapping a piece of furniture may convey the quality and composition of the material.

The operation 166 the interaction is recorded. At this operation the interaction with the product creates a sound which is captured by a recording device. In some examples, many recordings of an interaction are captured and processed and selected either manually or automatically based on sound quality features.

The operation 168 the recording of the interaction is stored. The recording may be stored with tags or metadata based on the test product, the interaction object and method used. Tags or metadata can also include which surface was interacted with and with what force the interaction takes place.

The method 160 can be repeated with several times with the same test product to capture different interactions. The method 160 can also be repeated with a plurality of different products.

Figure 4:
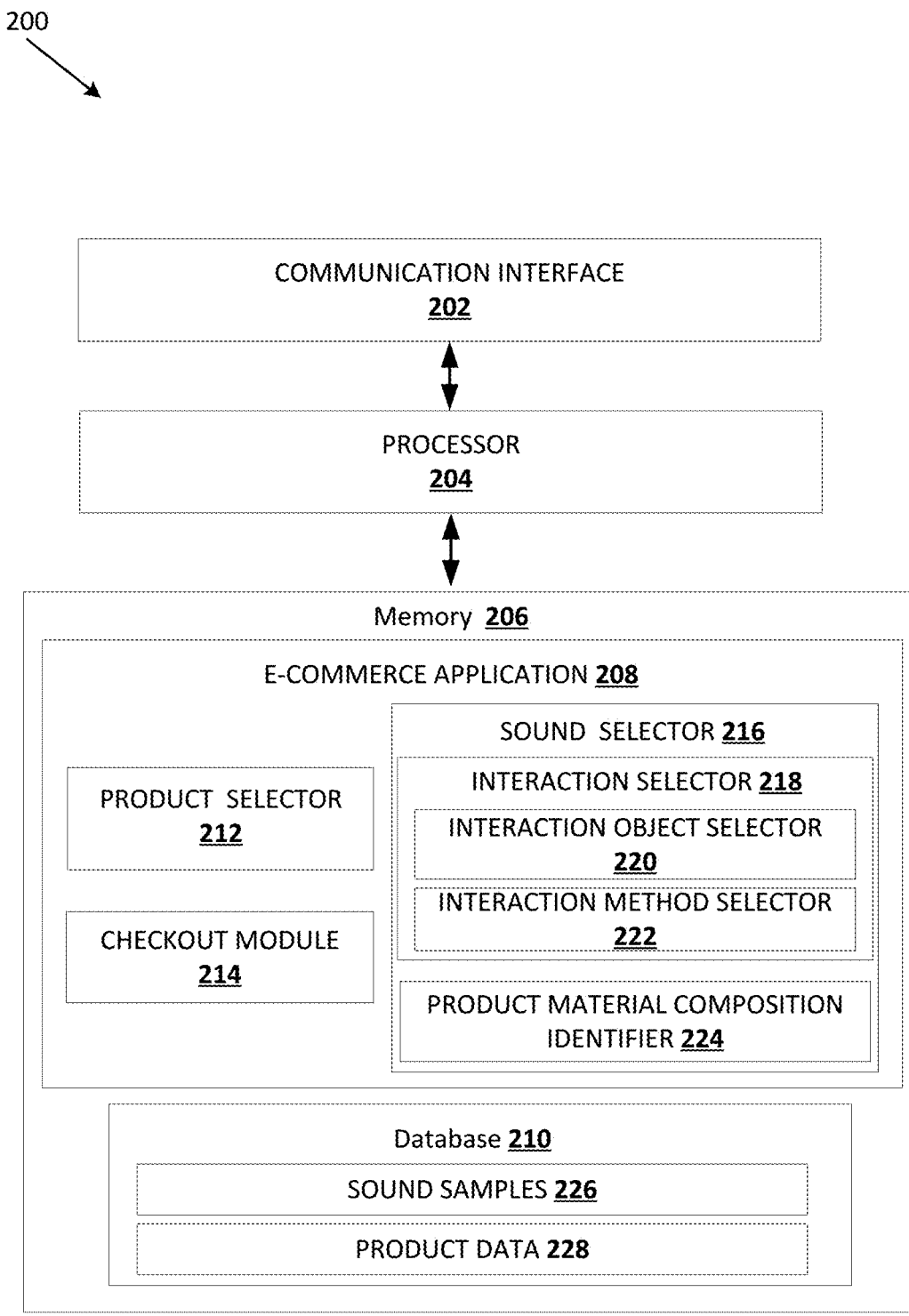
FIG. 4 is an example embodiment of a computing system.

FIG. 4 is an example embodiment of a computing system 200 usable with an e-commerce application. In some examples the computing system 200 is part of the server 104 as shown in FIG. 1. The computing system 200 includes a communication interface 202, a processor 204, and a memory 206. The memory 206 can include an e-commerce application 208 and a database 210. The e-commerce application 208 includes a product selector 212, a checkout module 214, and a sound selector 216. The sound selector 216 includes an interaction selector 218 and a product material composition identifier 224. The interaction selector 218 includes an interaction object selector 220 and interaction method selector 222. In some examples, the database 210 includes sound samples 226 and product data 228.

The computing system 200 can include a communication interface 202. Is used as an interface with a network. In some examples, the network is a public network such as the internet. The communication interface is configured to receive and transmit data, for example to access data in an external database, or to serve a web interface usable for an e-commerce application.

The computing system 200 can include a processor 204. The processor 204 can be any of a variety of types of programmable circuits capable of executing computer-readable instructions to perform various tasks, such as mathematical and communication tasks.

The computing system 200 can include a memory 206. The memory 206 can include any of a variety of memory devices, such as various types of computer-readable or computer storage media. The memory 206 can include an e-commerce application 208 and a database 210.

The memory 206 can include an e-commerce application 208. The e-commerce application 208 can be a web application which allows a plurality of users to online shop. The e-commerce application includes a product selector 212, a checkout module 214, and a sound selector 216.

In some examples, the e-commerce application 208 includes a product selector 212. The product selector is configured to provide an e-commerce user interface to a user which allows the user to select one or more products from an e-commerce catalog. In some examples the product selector 212 includes a catalog of products from a single related store. In other examples, the product selector 212 is part of an e-commerce platform for a variety of stores to sell products. The product selector can provide products using a list, a grid, a search engine, and many other methods which allow for the presentation of products in an e-commerce application.

In some examples, the e-commerce application 208 includes a checkout module 214. The checkout module allows the user to confirm the selection of one or more products and completes the purchase of the product. Completing the purchase of the product can include processing payment and shipping information for the consumer and placing an order for delivery or pick up of the one or more selected products. In some examples, the selected products are placed in a shopping bag which the consumer views and confirms before entering payment and shipping details.

In some examples, the e-commerce application 208 includes a sound selector 216. The sound selector 216 provides one or more audio samples associated with a product to a consumer. The sound selector 216 determines which audio samples to provide based on the displayed products and selections. The sound selector 216 can include an interaction selector 218 and a product material composition identifier 224.

Product material composition can be a component a consumer is interested in before purchasing a product. For example, crystal glass can have a different material quality than normal glass. In another example different wood types have different properties. These different properties can sometimes be perceived using sound. The product material composition identifier can assign a sound material property which represent how the product would sound in various interactions based on the real-world composition.

In some examples, the sound selector will select a sound based on the interaction selector 218 and product material composition identifier 224. In some examples, the interaction selector will provide a user interface which allows a consumer to make various selections and provide a sound sample based on those selections.

In some examples, the interaction selector 218 includes an interaction object selector 220. The interaction object selector 220 can provide a user interface allowing a user to select an object to interact with a product. In some examples, the interaction selector may provide a list or a selectable button to select a product. In other examples, a user can select an interaction object in a virtual reality system. Examples of interaction objects include a hand, a finger, a foot, a rubber hammer, a metal hammer, and a drumstick.

In some examples, the interaction selector 218 includes an interaction method selector 222. Interaction methods include hitting, tapping, scratching, kicking, rubbing, and any other motion which makes sound with a material. In some examples, the interaction method selector 222 will provide a user-interface which allows a customer to select an interaction method. In some examples, the user-interface is part of a web-application or a mobile application. In other examples, the user-interface may be part of a virtual reality system and the method is based on the user's virtual interactions with the product.

The sound selector can include a product material composition identifier 224. In some examples, the product material composition identifier 224 is associated with a product. In other examples, one or more surfaces with different materials are associated with a product, the product material composition identifier 224 can provide the material composition for each surface and the sound selector will provide a sound sample based on the surface which is interacted with by the interaction method and interaction object.

In some examples, the product material composition identifier 224 identifies a sound sample which is associated with a single product. For example, the material composition identifier may specifically identify sound samples which were recorded from the product selected by the consumer. In other examples, the product material composition identifier 224 is generally related to a material property of a product. For example, a plurality of tables with a solid wood tops could be assigned the same material property. In other examples, a plurality of different types of furnishings with a similar material property of the products may correspond to the same product material composition identifier 224. An example is tables and chest of drawers made out of the same type of material such as solid wood can share the same material composition identifier for the solid wood material.

The computing system 200 can also include a database 210. The database 210 can store data related to the e-commerce application 208. In some examples the database contains sound samples 226 and product data 228.

In some examples the database 210 includes sound samples 226. The sound samples 226 include audio data which conveys a material property of a product. In some examples the sound samples 226 are uploaded from a recording studio like the recording studio illustrated and described in reference to FIG. 2. The sound samples can include a plurality of tags or metadata which describe the audio data in the sound sample 226. For examples the tags may identify that the sound sample is based on the test product, the interaction object and method used. Tags can also include information on which surface was interacted with and with what force the interaction takes place.

The database 210 can also include product data 228. Product data 228 includes any information about a product which is useful to a consumer. Product data 228 can include names of products, pictures of products, description of the products, price of the products, availability of the product, and many more examples of information which is helpful for presenting a product in an e-commerce application. Some products in the product data 228 may further comprise a pointer to a corresponding sound sample 226 or corresponding sound samples 226.

Figure 5:
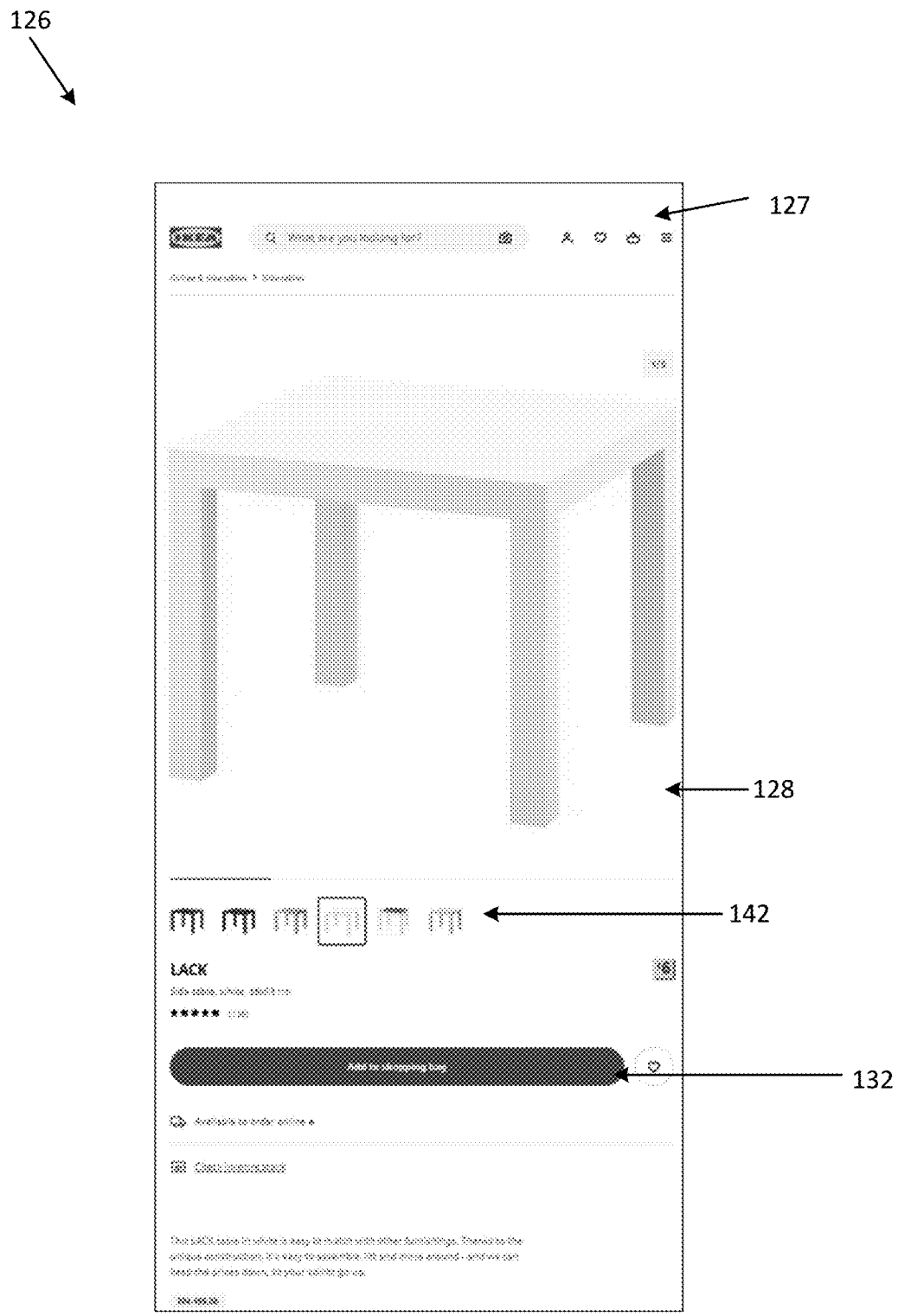
FIG. 5 is an example user-interface of the product quality conveyance application.

FIG. 5 is an example user-interface 127 of the product quality conveyance application 126. Another example of the product quality conveyance application 126 is illustrated and described in reference to FIG. 2. In some examples, the user-interface 127 includes a product viewer 128, a product purchaser 132, and product configuration selector 142.

In some examples the user-interface 127 includes a product viewer 128. In some examples the product viewer displays one or more pictures of a product. The product viewer may also include a name of the product. In other examples, the product viewer may be presented within a virtual reality system where the product is placed in a location or room.

In some examples the user-interface 127 a product purchaser 132. The product purchaser 132 allows a user to select a product to proceed with a purchasing process. In some examples, the product purchaser 132 places the product in a shopping cart which is involved in a checkout process.

In some examples the user-interface 127 includes a product configuration selector 142. The product configuration selector 142 may present a variety of different product configurations. Examples of product configurations include different colors, sizes, materials, and any other configuration possible for a product.

Figure 6:
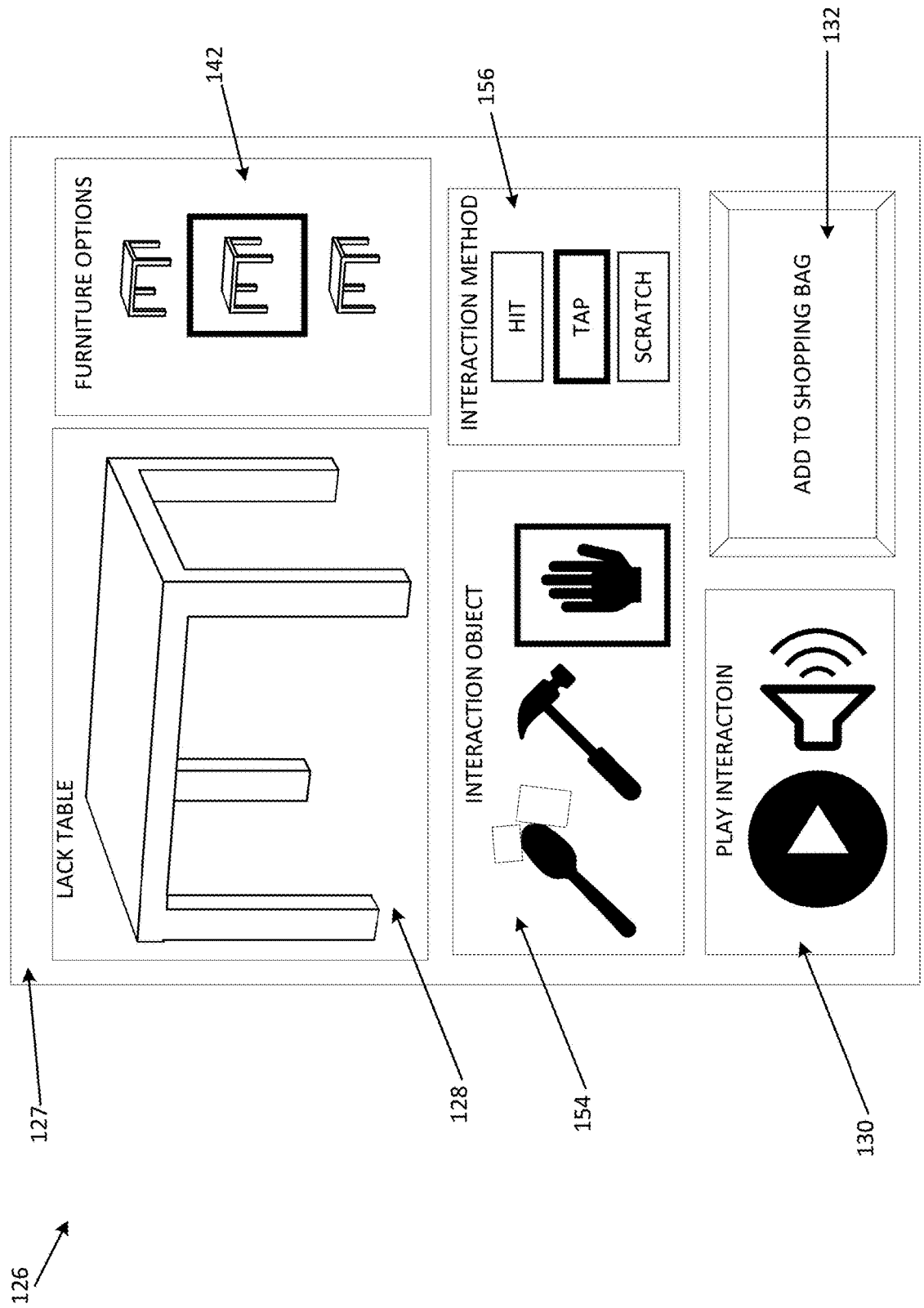
FIG. 6 is another example user-interface of a product quality convey application.

FIG. 6 is another example user-interface 127 of a product quality conveyance application 126. Another example of the product quality conveyance application 126 is illustrated and described in reference to FIG. 2. The user-interface includes a product viewer 128, an interaction sound controller 130, a product configuration selector 142, an interaction object selector 154, and an interaction method selector 156.

In some examples the user-interface 127 a product viewer 128. Is another example of the product viewer 128 described and illustrated in reference to FIG. 5. The product viewer 128 can display one or more products which a customer is interested in. The product viewer 128 can also display a product name other product information like description, price, and inventory.

In some examples the user-interface 127 includes an interaction sound controller 130. The sound controller is used to imitate playing an audio recording of an interaction. In the example show, the interaction sound controller 130 is a user actuated play button. In other examples, the interaction sound controller 130 may be included in the product viewer 128. For example, a user can select a surface of a product to interact with that surface. Interaction can for example be done by clicking a mouse or tapping a touch screen. In other examples the interaction sound controller is part of a virtual reality system or augmented reality system, where the interaction can include moving a controller of the AR/VR system towards a digital representation of the product to interact with it. The sound played will relate to the product selected, the interaction object selected, and the interaction method selected.

In some examples the user-interface 127 a product configuration selector 142. The product configuration selector 142 is another example of the product configuration selector 142 illustrated and described in reference to FIG. 5. The product configuration selector 142 may present a variety of different product configurations. Examples of product configurations include different colors, sizes, materials, and any other configuration possible for a product.

In some examples the user-interface 127 an interaction object selector 154. The interaction object selector 154 allows a user to select an object to interact with the product. In the example shown, the interaction object selector 154 includes three objects a spoon, a hammer, and a hand. In the example of the interaction object selected is a hand.

In some examples the user-interface 127 and an interaction method selector 156. The interaction method selector 156 allows a user to select an interaction method to interact with the product. In the example shown the interaction methods include hit, tap and scratch with tap being selected.

Figure 7:
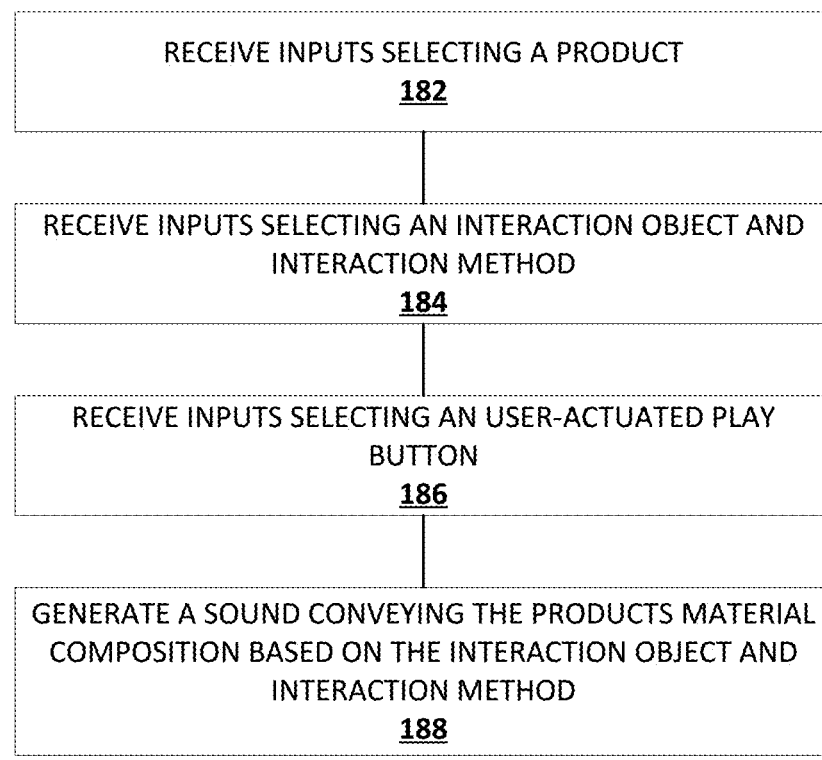
FIG. 7 is a flow chart illustrating an example method of conveying a material property of a product.

FIG. 7 is a flow chart illustrating an example method 180 of conveying a material property of a product. The method 180 can include the operations 182, 184, 186, and 188. The method 180 can be implanted with the product quality conveyance application 126 as shown in the examples of FIGS. 1 and 6. The method 180 can be implemented with the user-interface 127 as shown in the example of FIG. 6.

The operation 182 the method 180 receives inputs selecting a product. Selecting a product includes any of the many different ways a product is selected in an e-commerce system.

The operation 184 the method 180 receives inputs selecting an interaction object and interaction method. A user can select a specific interaction object and a specific interaction method.

The operation 186 the method 180 receives inputs selecting a user-actuated play button. In some examples the operation 186 is in response to the user selecting a surface or through some other user-interface method.

The operation 188 a sound is generated based on the material composition of the selected product, the interaction method, and the interaction object. For example, a sound sample will be selected from a database which relates to a wood table being tapped on by a hand when the table is selected as the product. The interaction object selected is a hand. and tapping is selected as the interaction method. A person of ordinary skill in the art would recognize that there are many different configurations to generate a sound which conveys the material composition of a selected product and these different configurations are included in the scope of this disclosure.

In some examples the sound generated at the operation 188 represents the physical state physical properties or material composition of the object. For example, if a user knocks with a spoon on a wooden desk the sound generated based on the physical real world properties of the wooden desk. These properties will be different if the wooden desk is solid wood or hollow wood.

Figure 8:
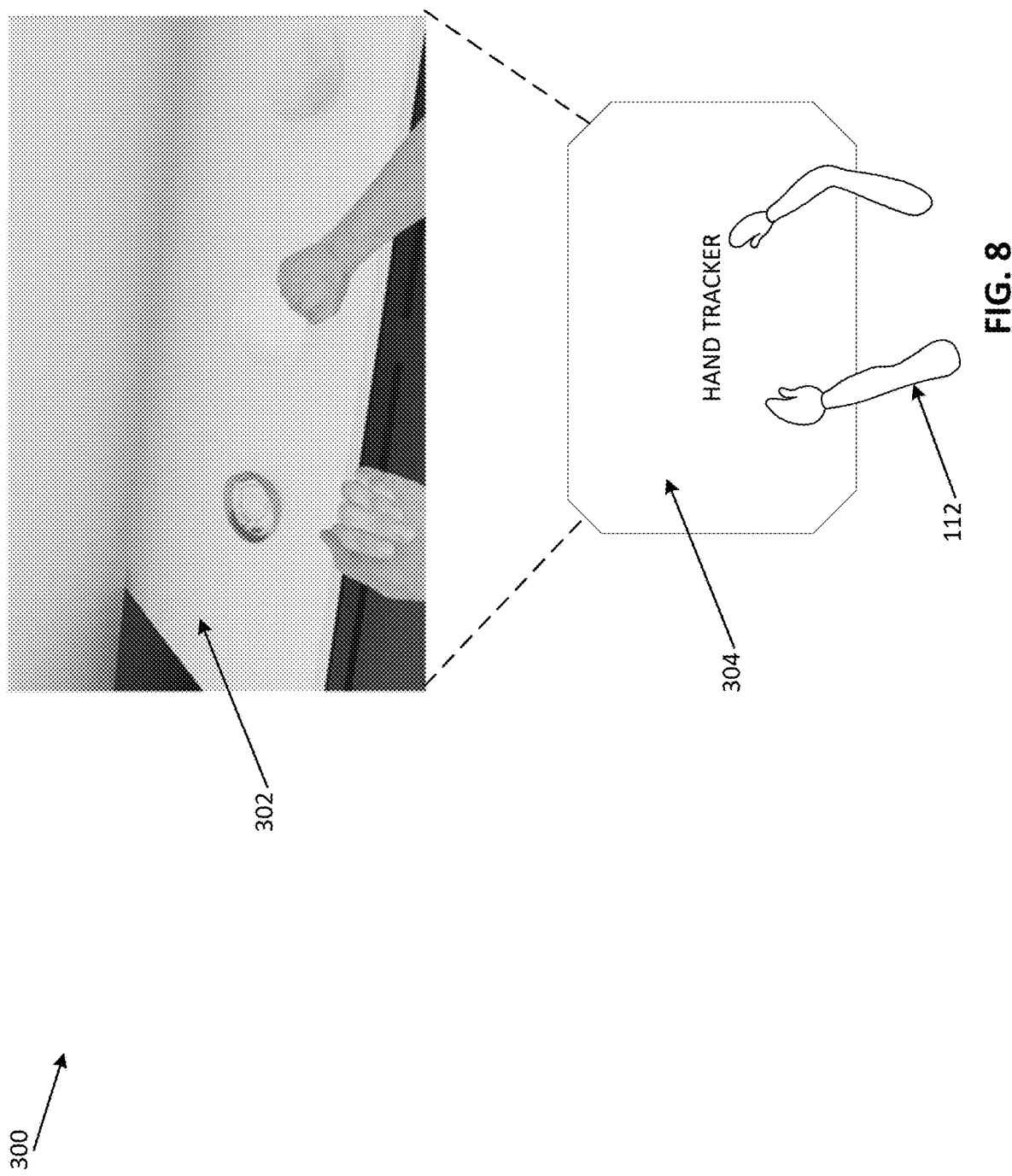
FIG. 8 is a virtual reality system of a product quality convey application.

FIG. 8 is a virtual reality system 300 of a product quality conveyance application 126. Another example of the product quality conveyance application 126 is illustrated and described in reference to FIG. 2. In some examples, the virtual reality system 300 includes a virtual reality display 302, a hand tracker 304 and a consumer 112. In some embodiments, other trackers are used. For example, a body tracking of system or any other system for interacting with the items in the virtual scene.

The virtual reality system 300 can be any virtual or augmented reality system. In some embodiments the virtual reality system can include an Oculus® system. The virtual reality system 300 generates sounds based on the consumer 112 interacting with a virtual product. The virtual reality system 300 also works with an e-commerce web application which allows the consumer to purchase one or more of the products displayed in the application. In some examples, the virtual reality system 300 works with a furniture layout design system, which allows a user to place furnishing products in one or more rooms which a user can explore and interact with one or more of the furnishings. Such furniture layout design system can also be realized in a smart phone app, a web-application or desktop-application using 2D or 3D representations of the home and the selected furnishing products.

The virtual reality system 300 includes a virtual reality display 302. In some examples, the virtual reality display may be presented on a monitor. In other examples, the virtual reality display can be a mobile computing device, or a virtual reality headset. The virtual reality display can receive inputs from the hand tracker 304, to generate an image which includes a virtual representation of the consumer 112, as shown by the hands in the figure shown. The virtual reality display can also display one or more product which are being sold in an e-commerce application.

The virtual reality system 300 includes a hand tracker 304. In some examples the hand tracker may be a sensor which tracks a user's movements. In other examples, the hand tracker may be controllers containing sensors which track a user's movements. The hand tracker receives inputs and provides the movements to the product quality conveyance application.

The hand tracking can allow the customer to interact with products naturally as the consumer would in real life. In one embodiment disclosed these natural interactions are used to create sounds based on these movements. For example, if a user hits a virtual object with his tracked hand, he should hear a spatialized playback of a hand hitting that object in the correct distance and stereoscopic field so as to accurately represent the sound that the interaction would normally make. This can be extended to any natural method of interaction including touching, holding, hitting, scratching or any method that someone could naturally interact with any object using their hands.

The hand tracking can take into account hand velocity, point of contact with virtual object, and hand gesture. For example, the hand tracker can check if the hand is in a clenched fist, outstretched palm or single finger touching.

The virtual reality system 300 includes a consumer 112. The consumer 112 interacts with a virtual product which generates sounds based on these interactions. The consumer 112 can then purchase one or more products using the virtual reality system.

Figure 9:
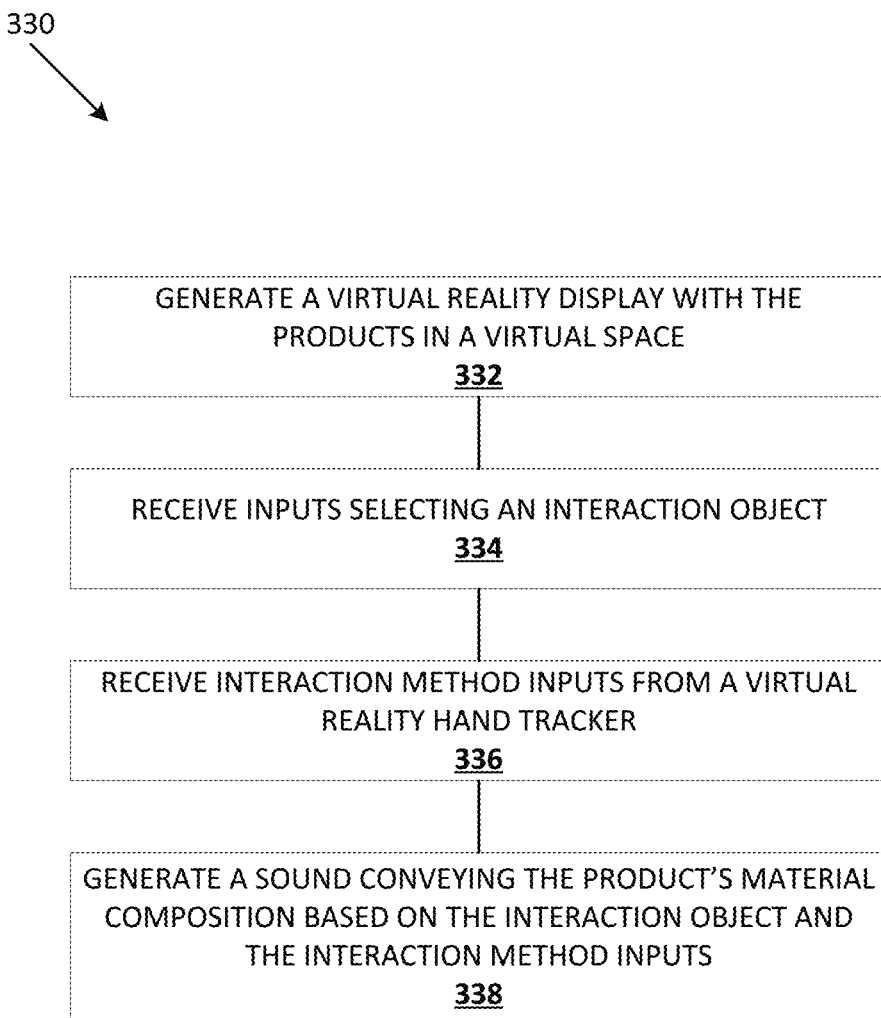
FIG. 9 is a flow chart illustrating an example method of online shopping.

FIG. 9 is a flow chart illustrating an example method 330 of online shopping. The method 330 includes the operations 332, 334, 336, and 338. The method 330 can be performed by the virtual reality system 300 described and illustrated in reference to FIG. 9.

In the operation 332, a virtual reality display is created with one or more products in a virtual space. In some examples, a consumer selects the products which are displayed. In other examples, the virtual space is an entire store which includes a catalog of products which a user can interact with. In some examples, the virtual reality display is an augmented display which places the product in the space where the consumer is located. The display can be any simulated environment including augment reality, virtual reality, mixed reality, or any other visually based medium.

The operation 334 the virtual reality system receives inputs selecting an interaction object. In some examples, the consumers virtual hands are the interaction objects. In other examples, the user selects a virtual interaction object in an interaction space, such as picking up a virtual drum stick from a virtual table.

The operation 336 interaction method inputs are received using a hand tracker. For example, the hand tracker may track a hand hitting the virtual product with a virtual drumstick. The hand tracker can track which surface is hit and with what force the product is hit.

The operation 338 a sound conveying a products material composition is generated based on the interaction object and the interaction method inputs. For example, the sound may be based on the movement tracked by the hand tracker, including which surface is interacted with, the type of motion, and the force of the motion.

Figure 10:
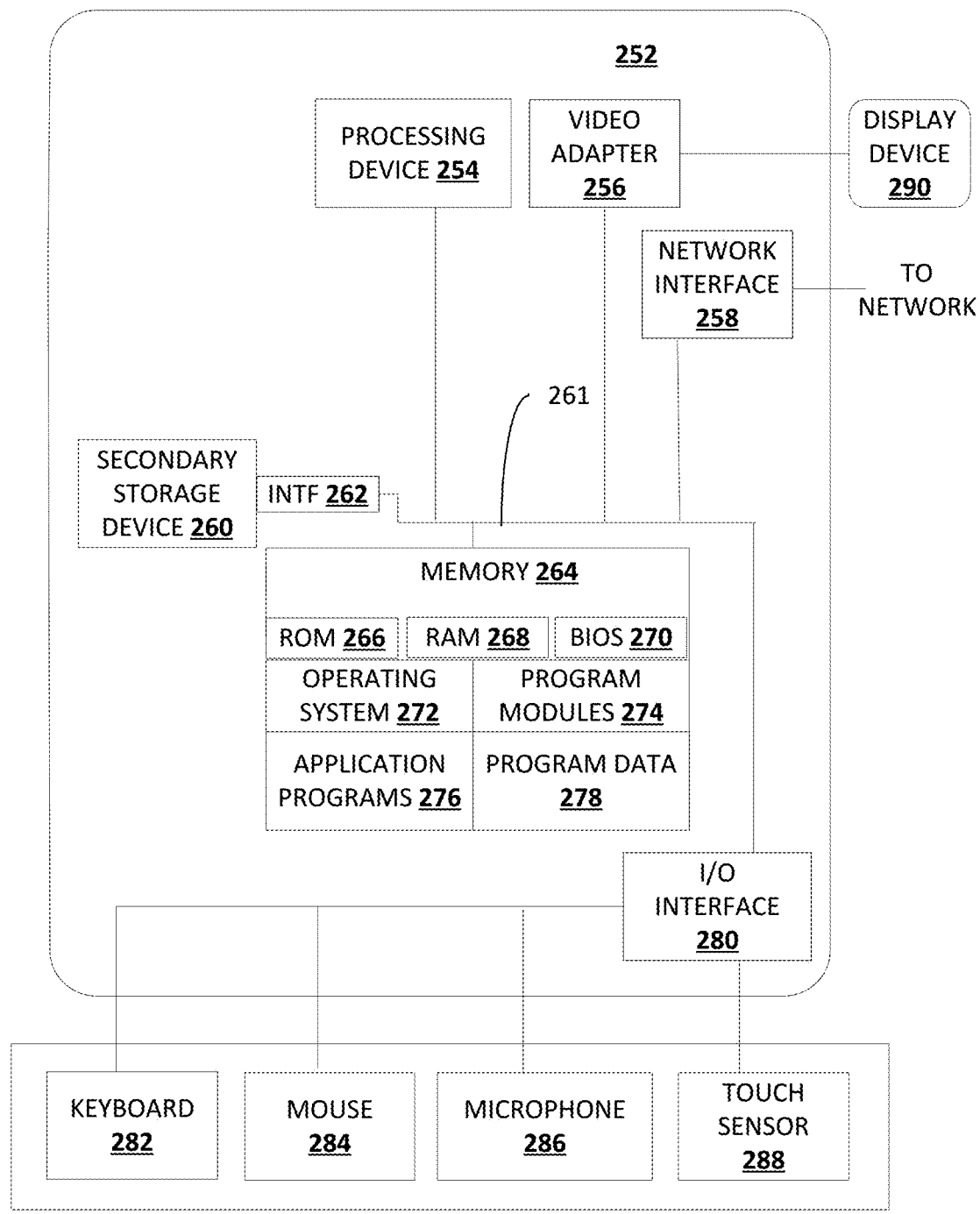
FIG. 10 illustrates an exemplary architecture of a computing device.

FIG. 10 illustrates an exemplary architecture of a computing device 252 that can be used to implement aspects of the present disclosure, including any of the plurality of computing devices described herein. The computing device 252 illustrated in FIG. 10 can be used to execute the operating system, application programs, and software described herein.

Examples of computing devices suitable for the computing device 252 include a desktop computer, a laptop computer, a tablet computer, a mobile computing device (such as a smartphone, an iPod® or iPad® mobile digital device, or other mobile devices), a computing device coupled with a kiosk, or other devices configured to process digital instructions.

The system memory 264 includes read only memory 266 and random access memory 268. A basic input/output system 270 containing the basic routines that act to transfer information within computing device 252, such as during start up, is typically stored in the read only memory 266.

The computing device 252 also includes a secondary storage device 260 in some embodiments, such as a hard disk drive, for storing digital data. The secondary storage device 260 is connected to the system bus 261 by a secondary storage interface 262. The secondary storage devices 260 and their associated computer readable media provide nonvolatile storage of computer readable instructions (including application programs and program modules), data structures, and other data for the computing device 252.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 260 or memory 264, including an operating system 272, one or more application programs 276, other program modules 274 (such as the software described herein), and program data 278. The computing device 252 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides input to the computing device 252 through one or more input devices. Examples of input devices include a keyboard 282, mouse 284, microphone 286, and touch sensor 288 (such as a touchpad or touch sensitive display). Other embodiments include other input devices. The input devices are often connected to the processing device 254 through an input/output interface 280 that is coupled to the system bus 261. These input devices can be connected by any number of input/output interfaces, such as a parallel port, serial port, game port, or a universal serial bus. Wireless communication between input devices and the interface is possible as well, and includes infrared, BLUETOOTH® wireless technology, 802.11a/b/g/n, cellular, or other radio frequency communication systems in some possible embodiments.

In this example embodiment, a display device 290, such as a monitor, liquid crystal display device, projector, or touch sensitive display device, is also connected to the system bus 261 via an interface, such as a video adapter 256. In addition to the display device 290, the computing device 252 can include various other peripheral devices (not shown), such as speakers or a printer.

When used in a local area networking environment or a wide area networking environment (such as the Internet), the computing device 252 is typically connected to the network through a network interface 258, such as an Ethernet interface. Other possible embodiments use other communication devices. For example, some embodiments of the computing device 252 include a modem for communicating across the network.

The computing device 252 typically includes at least some form of computer readable media. Computer readable media includes any available media that can be accessed by the computing device 252. By way of example, computer readable media includes computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 252.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 10 is also an example of programmable electronics, which may include one or more such computing devices, and when multiple computing devices are included, such computing devices can be coupled together with a suitable data communication network so as to collectively perform the various functions, methods, or operations disclosed herein.

In some embodiments, the product quality inspect system provides sound in three-dimensions. For example, different sound effects are applied to the audio data to add the sense of depth to the sound sample. A user selects a furnishing on a 2D image of a 3D scene and the sound sample with sound effects creates a perception that the sound is coming from the location of the selected furnishing in the scene. For example, the volume can be adjusted and reverb effects can be applied to the sound sample. Other examples of effects include echo sound effects, EQ filtering, low-pass filtering, and hi-pass filtering. In some embodiments, the pitch of the sound is adjusted such that the same sound source is used for different sized furnishing. In some examples, minor adjustments to the pitch are made for subsequent selections of a product. For example, the human ear may be sensitive to repeating sound, and by changing the pitch for each interaction, the sound feels more realistic to a user. In some embodiments, iconic interactions are provided to a user. An iconic interaction is an interaction which relates to how a product is typically used or handled. For example, the sound of whipping something in a bowl. Advantages of the above effects and iconic interactions include improved realistic feeling of interacting with a furnishing in an e-commerce application.

Figure 11:
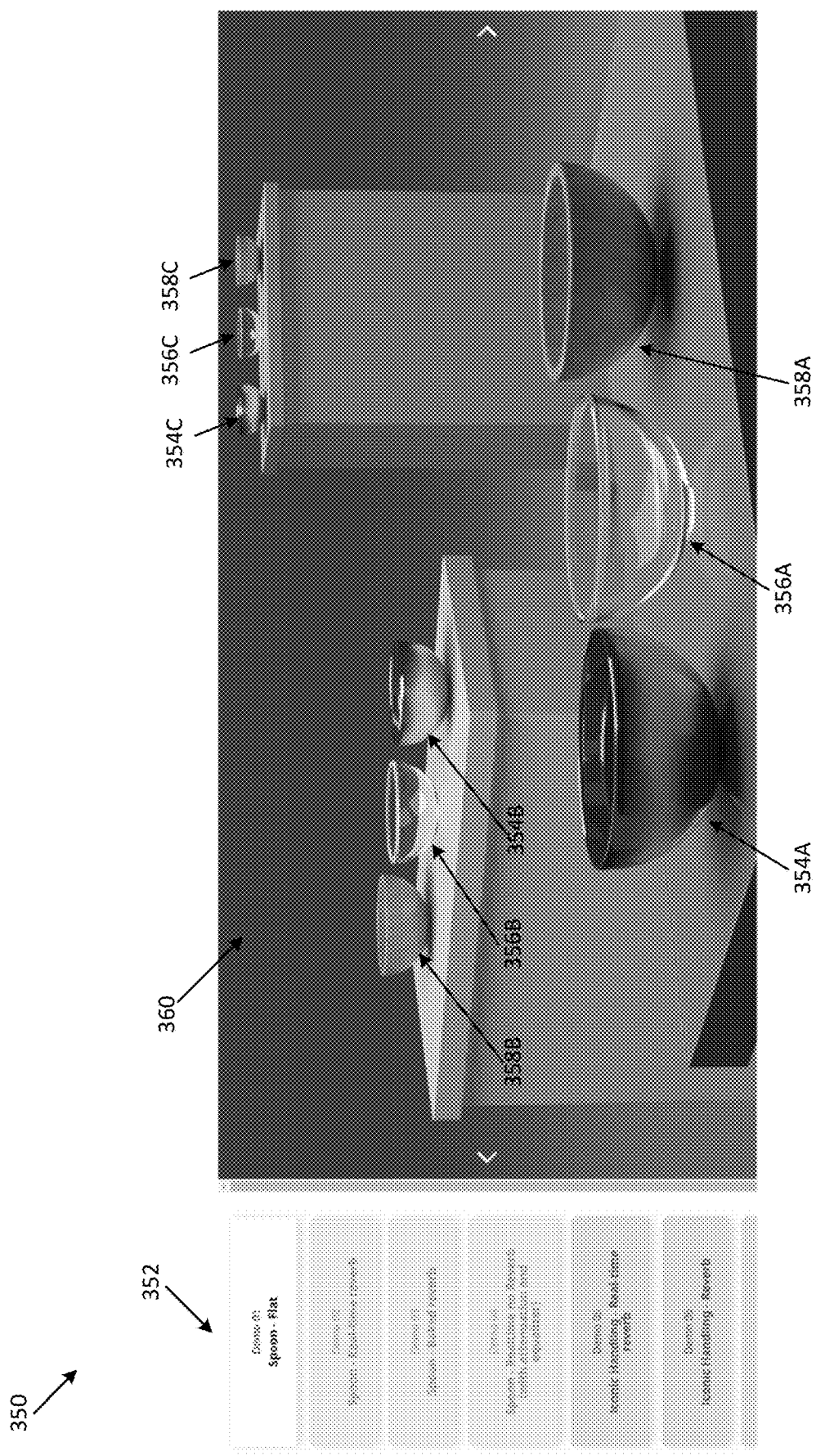
FIG. 11 illustrates an example user-interface of the product quality conveyance application.

FIG. 11 illustrates an example user-interface 350 of the product quality conveyance application. The user-interface 350 includes an interaction selector 352, and a scene 360. The scene 360 includes images of furnishings including images of metal bowls 354A, 354B, 354C, glass bowls 356A, 356B, 356C, and wood bowls 358A, 358B, 358C.

The example user-interface 350 allows a user to try out different interactions with a variety of different products (e.g., furnishings). In the example shown, a user makes an interaction selection using the interaction selector 352. The user interface further receives input to select a specific furnishing in the scene 360. When a user selects a furnishing in the scene 360 the user-interface 350 generates a sound based on the interaction selected, the furnishing selected, and the location of the selected furnishing in the scene. In some embodiments, a sound is provided for each selection (e.g., click) of a furnishing. In some examples, the sound sample reflects a material composition of the selected product. Example of I/O devices and technology used to receive inputs include a mouse, keyboard, touch interface, virtual reality interface, augmented reality interface, mixed reality interface, the hand tracking interface illustrated in FIG. 8, or other technologies or devices used for receiving a selection from a user.

The interaction selector 352 allows a user to select an interaction with the furnishing. Examples of interactions include hitting the furnishing with a spoon, iconic handling of the object (e.g., the sound of handling a furnishing), an iconic function (e.g., an iconic use like whisking a utensil in a bowl, scratching an object, etc.). Additional example iconic interactions are described herein. The example shown includes a flat selection. The flat selection plays the sound sample without any depth sound effects. In some examples, the interaction selector 352 is not part of the user-interface 350. In these examples, one of the interactions is configured to be used when the user interacts with the objects 354, 356, 358 in the scene 360.

In one embodiment, a user can select an interaction to scratch the furnishing. In this embodiment, the sound sample can be further based on the movement received by the I/O device. For example, a user moving a finger around an object on a touch screen. The receive movements, direction, and speed can be used to determine and add additional sound effects to the sound sample. For example, the volume may of the sound sample may increase if a user is moving their finger along a touch screen quickly.

In the embodiment shown, the scene 360 includes a plurality of furnishings. The scene 360 includes a metal bowls at a first position 354A, a second position 354B, and a third position 354C, a glass bowl at a first position 356A, a second position 356B, and a third position 356C, and a wood bowl at a first position 358A, a second position 358B, and a third position 358C. When a user selects one of the furnishings a sound sample is presented to the user. The sound sample is further based on the type of furnishing selected and the location of the furnishing in the scene.

The sound sample is selected based on the selected furnishing. In some embodiments, the sound sample is selected based on the material composition of the selected furnishing. For example, the metal bowls 354A, 354B, 354C, the glass bowls 356A, 356B, 356C, and the wood bowls 358A, 358B, 358C each have a different material composition. In the example shown, the scene 360 includes three sound samples. A first sound sample for the metal bowls 354A, 354B, 354C, a second sound sample for the glass bowls 356A, 356B, 356C, and a third sound sample for the wood bowls 358A, 358B, 358C. The sound sample is selected based on inputs receive from the user selecting one of the furnishings. The selected sound sample is modified based on the location of the furnishing to generate a sound specific to the location of the furnishing in the scene. This modification is done by applying sound effects to the sample. For example, the sound sample when the metal bowl at the first position 354A is selected is adjusted such that it is louder with less reverb when compared to the adjustment made to the sound sample when the metal bowl at the third position 354C is selected. Examples of adjustments include volume adjustment, reverb adjustments, other echo effect adjustments, different filters, etc.

In some embodiments, the sound sample is adjusted based on the size of the scene or other scene features. For example, the sound sample may include sound effects that adjust the sound sample to sound like it is outside when the scene 360 is an outside scene and a different set of adjustments when the scene is of a kitchen, and further set of adjustments for a bathroom. In some embodiments, the scene 360 includes a scene size value and the sound sample is adjusted based on the scene size value. In some examples, the scene size is calculated in real time based on features of the scene 360. In other examples, the scene size is added as metadata to the scene 360. For example, if the scene is large, the reverb effect may be applied differently compared to if the scene is small, such that an echo effect when interacting with objects in the larger scene is increased compare to the echo effect of a smaller scene.

In some embodiments, the pitch is adjusted, such that when a user selects a furnishing multiple times the pitch of each sound is not repetitive. In some examples, the pitch for each selection is adjusted randomly. In other examples, the sound sample may include a set number of different pitches which are presented in order that repeats. In further examples, a set number of sound samples with different pitches are provided where the current sound sample selection is randomly selected from the set of sound samples.

In typical embodiments, the user-interface 350 includes a feature for receiving inputs to complete a checkout process. For example, a button may be presented which allows a user to place a selected product in a shopping cart which when selected further directs the user to complete a checkout process. The checkout process can include selecting delivery, pickup options, entering payment details, entering delivery or pick up details, etc.

Applying sound effects to sound samples is possible in a variety of user interfaces. For example, sound effects can be added to the sound samples provided to a user in the user-interfaces illustrated in FIGS. 5 and 6, and the virtual reality system illustrated in FIG. 8.

Figure 12:
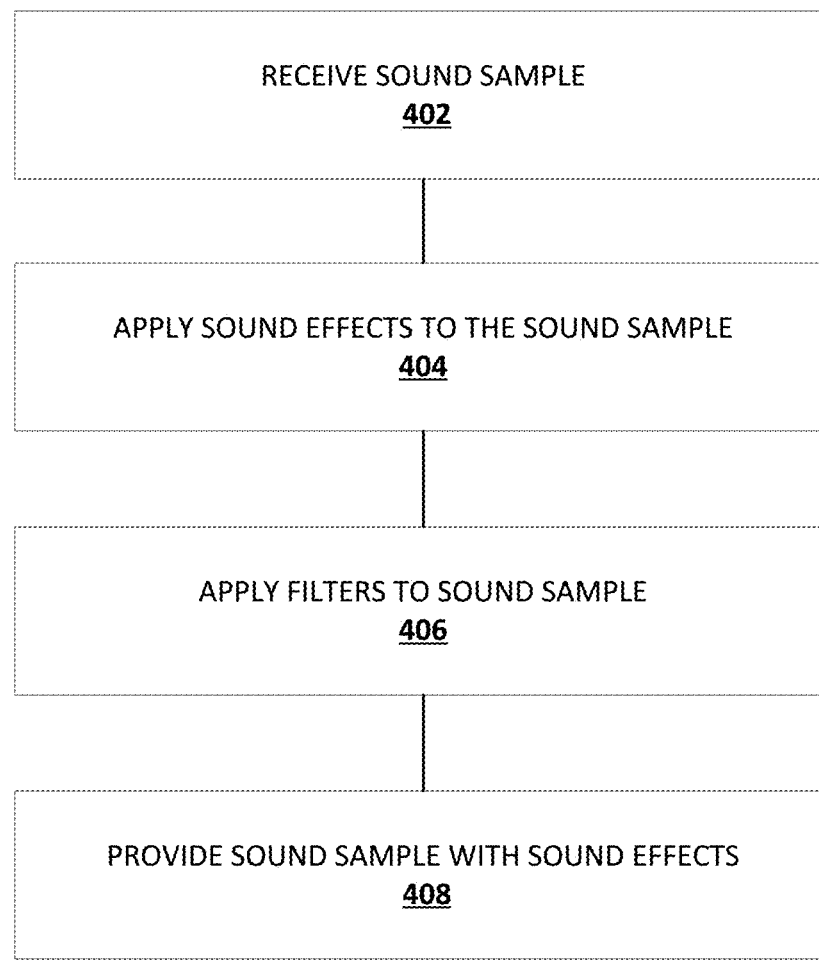
FIG. 12 illustrates an example method for providing a sound recording with effects.

FIG. 12 illustrates an example method 400 for providing a sound recording with sound effects. In some embodiments the method 400 is performed on a consumer computing device, for example the consumer computing device 110 illustrated and described in reference to FIG. 1. In other embodiments, the method 400 is executed on one or more servers. The method 400 includes the operation 402, 404, 406, and 408.

The operation 402 receive a sound sample. The sound sample captures an interaction with the object. The sound sample is recorded in a neutral acoustic environment at high resolution (sometimes referred to as dry sounds). In some examples, the sound samples are recorded in the recording studio 102 illustrated and described in reference to FIG. 2. In some examples, the sound samples are recorded using the method 160 illustrated and described in reference to FIG. 3. In some examples, the sound samples are recorded using the method 600 illustrated and described in reference to FIG. 16.

The operation 404 applies sound effects to the sound sample to add the sense of depth. In some examples, the sound effect is a volume adjustment. For example, if the selected furnishing is further away the volume for the sound recording is reduced. Another example sound effect applied to the sound recording, in some embodiments, is reverberation (reverb). Other possible sound effects include equalization and pitch shifting.

In some examples, the pitch of the sound sample is adjusted. In some examples, the product quality conveyance system may not include a recording of the exact product of interest for a user. In these examples, to provide a user with an accurate sound sample for the product of interest a sample from a product with the same material composition or similar material composition can be used. To further enhance this sound sample, a pitch adjustment to the sound sample can be made based on properties of the furnishing. In some examples, the adjustment is based on the size and shape of the selected product compared to the size and shape of the product used to record the sound. In some embodiments, the sound samples may be recorded for materials and not for specific products. In these embodiments, sound effects are applied based on characteristics of the various products having the material. In some embodiments, synthetic sounds are generated and recording is not required for some or all of the furnishing products.

In some embodiments, the pitch of the sound sample is adjusted to provide a user with distinct sounds for subsequent selections. In some examples, the pitch for each selection is adjusted randomly. In other examples, the sound sample may include a set number of different pitches which are presented in order that repeats. In further examples, a set number of sound samples with different pitches are provided where the current sound sample selection is randomly selected from the set of sound samples.

The operation 406 applies filters to sound sample. The sound recording can be further processed with one or more filters. Examples of possible filters applied to the sound recording include EQ filtering, hi-pass filters, and low-pass filters. For example, typically higher frequencies are more attenuated over a distance compared to lower frequencies. To apply this sound effect a hi-pass filter is applied to the sound sample.

The operation 408 provides sound sample with sound effects. In some embodiments, the sound sample with sound effects is provided at a consumer computing device which outputs the sound sample. In some embodiments, the sound sample is processed on a server and a plurality of sound samples each with different prebaked sound effects are provided to a consumer computing device. An example system-flow diagram of a method 600 for providing a consumer computing device with a plurality of sound samples with prebaked sound effects is illustrated and described in reference to FIG. 14. In other embodiments, the sound effects are applied to the sound sample in real time on a consumer computing device. An example system flow diagram of a method for applying the sound effects in real time on a consumer computing device is illustrated and described in reference to FIG. 15.

Figure 13:
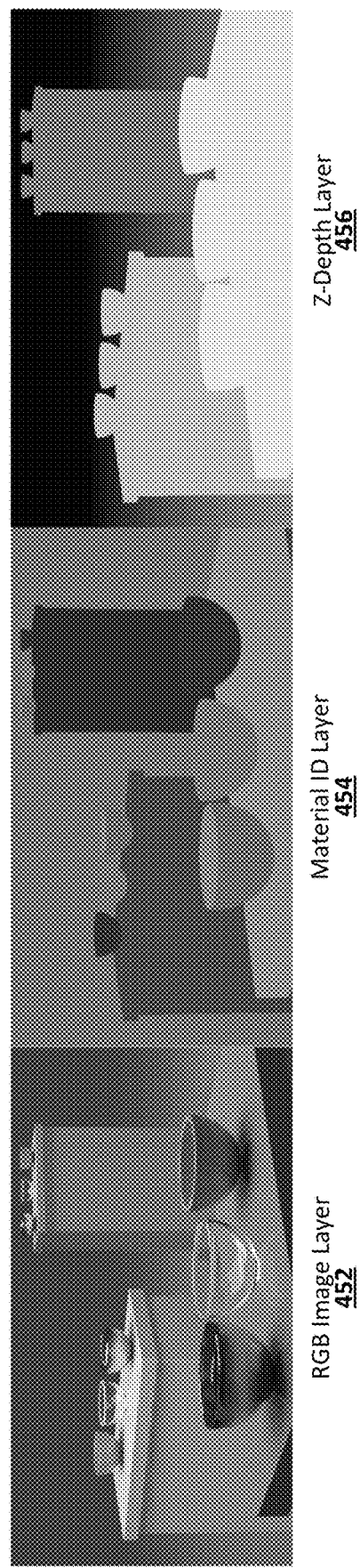
FIG. 13 illustrates an example image with multiple layers used for applying sound effects.

FIG. 13 illustrates an example scene 360 with multiple layers used for applying sound effects. The scene 360 includes an RGB image layer 452, a material ID layer 454, and a z-depth layer 456. The scene 360 is another example of the scene 360 illustrated in FIG. 11.

The RGB image layer 452 is the layer presented to a user on a user-interface for a product quality conveyance application. Typically, the RGB image is a two-dimensional image representing a three-dimensional scene. The RGB image typically contains one or more furnishings. A user is presented the RGB image layer and makes a selection of an object in the scene by selecting (e.g., clicking with a mouse or touching on a touch screen) a location on the image.

The material ID layer 454 defines the material at various locations in the image. In some embodiments, a plurality of sound samples are associated with a scene and a sound sample from the plurality of sound samples is selected based on the material ID at location selected by a user, where the material ID is determined using the material ID layer 454. In some examples, an object may comprise two or more different materials. The material ID layer will specify which material of the object is selected and provide the corresponding material ID. For example, a bowl may include a material ID for the exterior of the bowl which is made of a first material and a second material ID for the interior of the bowl which is made of a second material. In some examples, the material ID may further reflect a texture of the material.

The z-depth layer 456 defines the depth of an object at different locations in the scene 360. When a user selects a location in a scene a z-depth value is determined for that location. The z-depth is used to adjust the sound sample to include one or more sound effects/adjustments. In alternative embodiments, an image vector is used instead of the z-depth layer. One advantage of using an image vector includes conveying depth information while requiring less data.

In a typical example, the sound sample provided to a user is selected based on the material ID layer of the image and the sound effects applied to the selected sound sample is based on the z-depth layer.

In some embodiments, the material ID layer 454 and z-depth layer 456 are automatically generated by processing the RGB image layer to identify material IDs for detected objects and depth values for the objects. In other examples, these layers are generated manually.

Figure 14:
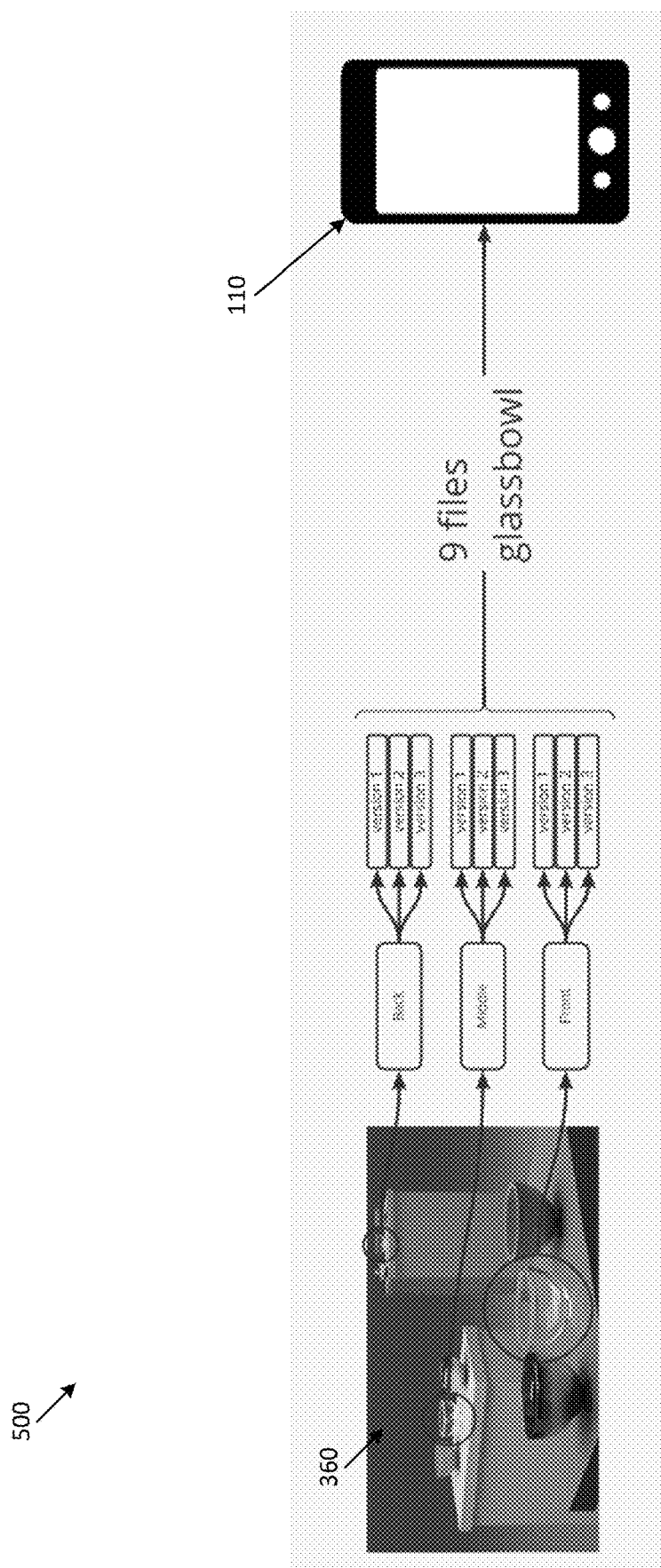
FIG. 14 illustrates an example method for applying sound effects.

FIG. 14 illustrates a system flow diagram of an example method 500 for applying sound effects. In the example shown, the sound effects are applied to the sound sample on a server (e.g., the server 104). Each sound sample with prebaked sound effects is provided to the consumer computing device 110. The example shown, includes providing nine sound sample files for the glass bowl in the scene 360. First, sound effects are applied to the sound sample to provide depth to the different locations of the glass bowl. For each of the samples with the prebaked distance effect three versions are generated with different pitches. These sound sample files are provided to the consumer computing device 110. An advantages of providing a plurality of sample files with prebaked sound effects include reduced consumer computing device 110 processing requirements. For example, applying reverb may be computationally intensive.

Figure 15:
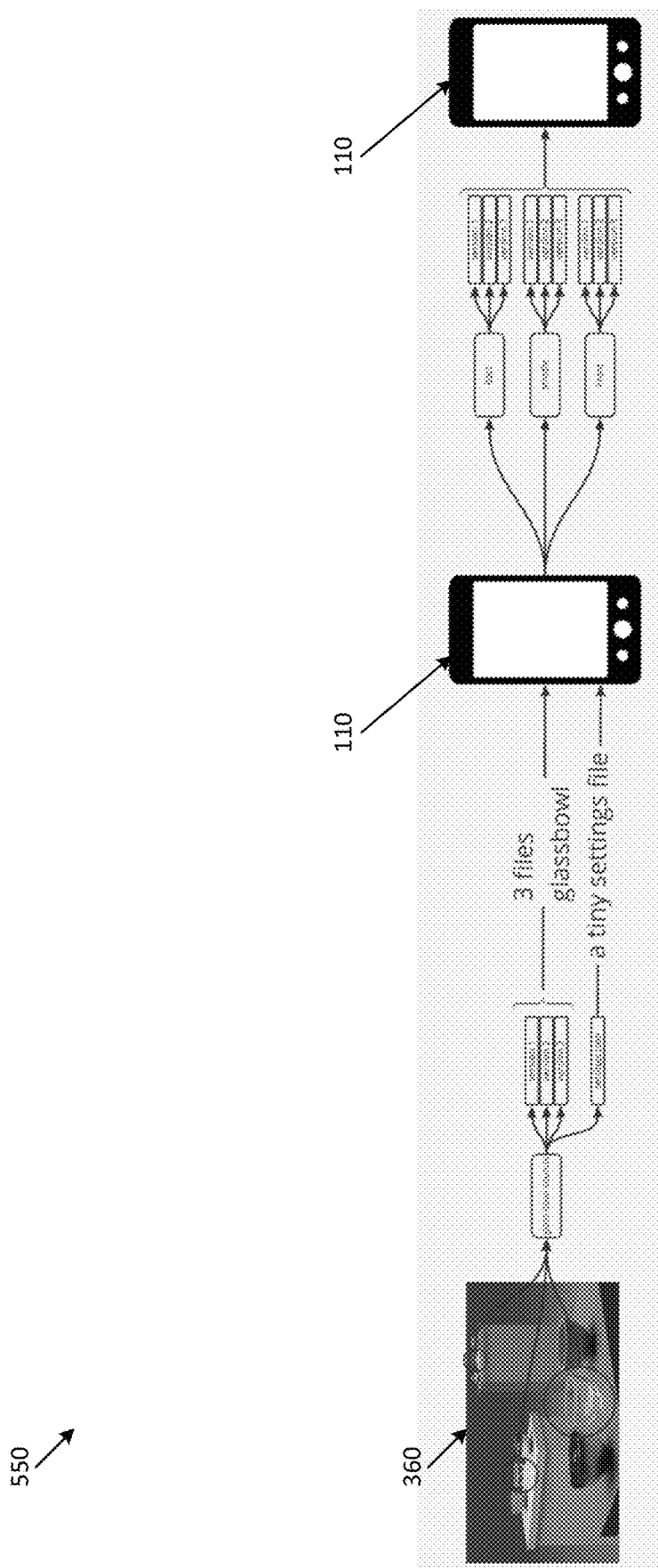
FIG. 15 illustrates an example method for applying sound effects.

FIG. 15 illustrates a system flow diagram of an example method 550 for applying sound effects. In the example shown, the sound effects are applied to the sound sample on the consumer computing device 110. The scene 360 includes a glass bowl at three locations. The sound sample for the glass bowl are provided with three different pitches and a settings file. The settings file includes depth values for the glass bowl at the three different locations. The consumer computing device processes the three sound samples with the settings file to apply sound effects to each sound sample and generate a plurality of sound samples for the glass bowls corresponding to the different locations. In the example shown, the consumer computing device 110 receives three sound samples with different pitches. In other examples, the consumer computing device 110 receives a single sound sample and generate the pitch adjustments either based on predetermined values or randomly. Advantages of real time application of sound effects on the consumer computing device 110 include improved application performance and reduced memory requirements.

In some examples, the e-commerce application 124 determines whether to provide the consumer computing with the sound samples with prebaked sound effects or the sound samples with the settings to provide sound effects in real time. In some of these examples, the e-commerce application 124 determines the capabilities of the consumer computing device 110. For example, some consumer computing device may not include the system requirements to apply the sound effects in real time. The e-commerce application can decide to provide the prebaked audio sample only to these consumer computing devices. In some examples, the method for applying sound effects to sound sample is based on the type of sound effects applied. For example, volume adjustments to the sound sample may be less computationally intensive and the sound effects can be applied on the consumer computing device, whereas reverb sound effects are more computationally intensive and might require the server to apply the sound effects. Accordingly, in some embodiments, only volume effects are applied to the sound sample. In these embodiments, the sound effects can be applied on the consumer computing device 110. In other embodiments, when reverb sound effects are applied the sound effects may be applied on a server and prebaked in the files sent to the consumer computing device 110.

Figure 16:
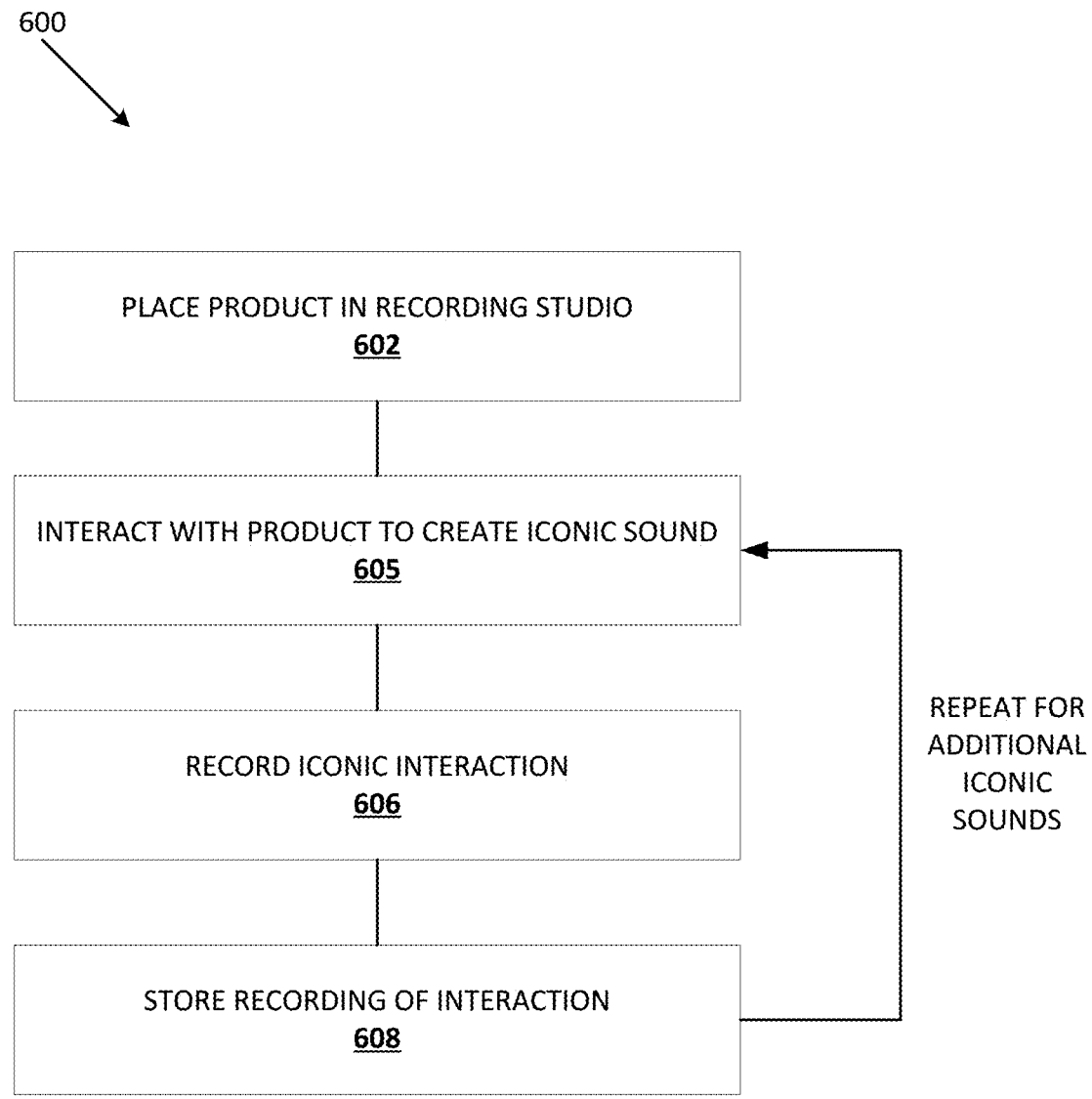
FIG. 16 illustrates an example method for recording iconic interactions.

FIG. 16 illustrates an example method 600 for recording iconic interactions. The method 600 includes the operations 602, 604, 606, and 608. The method 600 is another example of the method 160 illustrated in FIG. 3.

The operation 602 places a product in a recording studio. In some examples, the furnishing is placed in the recording studio 102 illustrated and described in reference to FIG. 2. In typical embodiments, the recording studio is configured to capture the sound in a neutral acoustic environment at high resolution (sometimes referred to as dry sounds).

The operation 604 interacts with the product to create an iconic sound. Iconic sounds include iconic handling and iconic function. Iconic handling includes handling the furnishing. For example, rocking a bowl on a surface, or placing a chair on the floor. Iconic function includes using the furnishing for its intended purpose. For example, whisking in a bowl or rolling an office chair with wheels.

The operation 606 records the iconic interaction. In typical embodiments, the iconic interaction with the object is recorded in a neutral acoustic environment at high resolution. The iconic handling or iconic function create a sound which is captured by a recording device. In some examples, many recordings of an interaction are captured and processed and selected either manually or automatically based on sound quality features.

The operation 608 stores the sound samples. The sound sample may be stored with tags based on the product, the iconic interaction (e.g., whether the sample captures the iconic handling or iconic function). Other details about the recording can also be stored with the sound sample.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

Additional Clauses

The following are additional clauses relative to the present disclosure, which could be combined and/or otherwise integrated with any of the embodiments described above or listed in the claims below.

Clause 1. A method of conveying a quality of a furnishing with an e-commerce system, the method comprising: presenting with the e-commerce system a listing for a furnishing; receiving an audio playback request; and presenting in response to the audio playback request an audio recording of an interaction with the furnishing, wherein the audio recording is indicative of a material composition of the furnishing.

Clause 2. The method of clause 1, wherein the interaction includes at least one of an interaction object and an interaction method.

Clause 3. The method of clause 1, wherein the interaction includes an interaction force.

Clause 4. The method of clause 1, the method further comprising: receiving a surface selection input selecting a surface of the furnishing, wherein the audio recording further conveys the material composition of the selected surface.

Clause 5. The method of clause 1, wherein the playback request further includes: generating a user-actuatable play element; and receiving an input selecting the user-actuatable play element.

Clause 6. The method of clause 1, the method further comprising: presenting a plurality of material composition options for the furnishing; and receiving inputs selecting one of the furnishings material composition options, wherein the material composition of the furnishing is further based on the selected material composition option.

Clause 7. The method of clause1, the method further comprising: receiving inputs initiating a checkout process to purchase the furnishing.

Clause 8. A method of online shopping, the method comprising: receiving an e-commerce user-interface including an identification of a furnishing and an audio playback user actuatable element; selecting the audio user actuatable element; receiving an audio recording of an interaction with the furnishing, they audio recording conveying a material composition of the furnishing; and playing the audio recording.

Clause 9. The method of clause 8, the method further comprising: selecting at least one of an interaction object and an interaction method, wherein the audio recording further conveys the selected interaction object and interaction method.

Clause 10. The method of clause 8, the method further comprising: selecting an interaction force, wherein the audio recording further conveys the selected interaction force.

Clause 11. The method of clause 8, the method further comprising: selecting a surface of the furnishing, wherein the audio recording further conveys the material composition of the selected surface.

Clause 12. The method of clause 8, the method further comprising: receiving inputs initiating a checkout process to purchase the furnishing.

Clause 13. An e-commerce system comprising: one or more processors; and one or more memory storage devices, the one or more memory storage devices storing data instructions that, when executed by the one or more processors, cause the one or more processors to: present with the e-commerce system a listing for a furnishing; receive an audio playback request; and present in response to the audio playback request an audio recording of an interaction with the furnishing, the audio recording conveying a material composition of the furnishing.

Clause 14. The e-commerce system of clause 13, wherein the instructions when executed by the one or more processors further cause the one or more processors to: receive a selection of an interaction object and an interaction method, wherein the audio recording corresponds with the selected interaction object and the selected interaction method.

Clause 15. The e-commerce system of clause 13, wherein the instructions when executed by the one or more processors further cause the one or more processors to: receive a selection of an interaction force, wherein the audio recording corresponds with the selected interaction force.

Clause 16. The e-commerce system of clause 13, wherein the instructions when executed by the one or more processors further cause the one or more processors to: receive a surface selection input selecting a surface of the furnishing, wherein the audio recording further conveys the material composition of the selected surface.

Clause 17. The e-commerce system of clause 13, wherein the playback request further includes to: generate a user-actuatable play element; and receive an input selecting the user-actuatable play element.

Clause 18. The e-commerce system of clause 13, wherein the instructions when executed by the one or more processors further cause the one or more processors to: present a plurality of material composition options for the furnishing; and receive inputs to select one of the furnishings material composition options, wherein the material composition of the furnishing is further based on the selected material composition option.

Clause 19. The e-commerce system of clause 13, wherein the instructions when executed by the one or more processors further cause the one or more processors to: receive inputs initiating a checkout process to purchase the furnishing; and complete the checkout process.

Clause 20. The e-commerce system of clause 13, wherein the audio recording is produced by recording an interaction with an example furnishing in a recording studio.

What is claimed is:

1. A method of conveying a quality of a furnishing with an e-commerce system, the method comprising:
generating a user interface presenting a listing for a furnishing including a scene with an image of the furnishing at the e-commerce system, the image of the furnishing having a depth value corresponding to a location of the image of the furnishing in the scene, wherein the depth value is determined by processing an image of the scene;
providing the user interface to a computing device;
receiving, via the user interface at the computing device, an audio playback request;
retrieving, from a database of the e-commerce system, an audio sample conveying a material composition of the furnishing based at least in part on an interaction with the furnishing; and
providing, in response to the audio playback request, the audio sample to the computing device, wherein the audio sample is presented as audio output at the computing device, and wherein the presented audio sample includes a sound effect based on the depth value.

2. The method of claim 1, wherein the sound effect is a volume adjustment.

3. The method of claim 1, wherein the sound effect is a reverb adjustment.

4. The method of claim 1, the method further comprising:
receiving a second audio playback request;
adjusting a pitch of the audio sample for the second audio playback request; and
presenting in response to the second audio playback request the audio sample with the adjusted pitch.

5. The method of claim 1, wherein the scene is further associated with a scene size and the sound effect is further based on the scene size.

6. The method of claim 1, wherein the scene further includes a second image of the furnishing at a second location, the second image of the furnishing having a second depth value corresponding to the second location of the image of the furnishing in the scene; and
wherein, receiving the audio playback request further comprises receiving a selection of one of the image or the second image, the sound effect being based ene on of the depth value or the second depth value based on the selection.

7. The method of claim 1, the method further comprising:
presenting a plurality of material composition options for the furnishing; and receiving inputs selecting one of the material composition options, wherein the material composition of the furnishing is further based on the selected material composition option.

8. The method of claim 7, wherein the scene is further associated with a material ID version of the scene wherein the material composition is based on a material ID at the location of the image of the furnishing.

9. The method of claim 1, wherein the audio sample captures an iconic interaction with the furnishing.

10. The method of claim 1, the method further comprising:
receiving inputs initiating a checkout process to purchase the furnishing.

11. The method of claim 1, wherein the scene is further associated with a z-depth version of the scene wherein the depth value is a z-depth value at the location of the image of the furnishing.

12. An e-commerce system, the e-commerce system comprising:
one or more processors; and
one or more memory storage devices, the one or more memory storage devices storing instructions that, when executed by the one or more processors, cause the e-commerce system to:
process an image of a scene with an image of a furnishing to determine a depth value corresponding to a location of the image of the furnishing in the scene;
generate a user interface with a listing for the furnishing including the scene with the image of the furnishing;
provide the user interface to a computing device;
receive, via the user interface at the computing device, an audio playback request;
retrieve, from a database of the e-commerce system, an audio sample conveying a material composition of the furnishing based at least in part on an interaction with the furnishing; and
provide, in response to the audio playback request the audio sample to the computing device;
wherein the audio sample includes a sound effect based on the depth value.

13. The e-commerce system of claim 12, wherein the sound effect is a volume adjustment.

14. The e-commerce system of claim 12, wherein the sound effect is a reverb adjustment.

15. The e-commerce system of claim 12, wherein the user interface further receives a second audio playback request, adjusts a pitch of the audio sample for the second audio playback request, and presents in response to the second audio playback request the audio sample with the adjusted pitch.

16. The e-commerce system of claim 12, wherein the e-commerce system provides a plurality of audio samples with different sound effects and the audio sample with the sound effect is selected from the plurality of audio sample based on received inputs with the audio playback request.

17. A user computing device, the user computing device comprising:
a processor; and
one or more memory storage devices, the one or more memory storage devices storing instructions that, when executed by the processor, cause the user computing device to:
present a user interface having a listing for a furnishing inducing a scene with an image of the furnishing, the image of the furnishing having a depth value corresponding to a location of the image of the furnishing in the scene, wherein the depth value is determined by an e-commerce system processing an image of the scene;
receive, via the user interface, an audio playback request;
receive, from the e-commerce system in response to the audio playback request, an audio sample conveying a material composition of the furnishing based at least in part on an interaction with the furnishing; and
present the audio sample, wherein the audio sample includes a sound effect based on the depth value.

18. The user computing device of claim 17, wherein the user computing device receives a plurality of audio samples with different sound effects from a server, wherein the audio sample with the sound effect is selected from the plurality of audio samples based on received inputs with the audio playback request.

19. The user computing device of claim 17, wherein the instructions when executed by the processor further cause the user computing device to:
process the audio sample to include the sound effect.

20. The user computing device of claim 17, wherein the user interface further receives inputs initiating a checkout process to purchase the furnishing.

* * * * *